United States Patent [19]
Allen

[11] Patent Number: 4,700,507
[45] Date of Patent: Oct. 20, 1987

[54] TREE BARK PROTECTOR

[76] Inventor: Charles R. Allen, 4812 Sundew, Union Lake, Mich. 48085

[21] Appl. No.: 846,067

[22] Filed: Mar. 31, 1986

[51] Int. Cl.$^4$ ............................................. A01G 13/02
[52] U.S. Cl. ....................................................... 47/23
[58] Field of Search ..................................... 47/23–25, 47/32

[56] References Cited

U.S. PATENT DOCUMENTS

| | | | |
|---|---|---|---|
| 574,998 | 1/1897 | Kent | 47/23 |
| 3,857,195 | 12/1974 | Johnson | 47/25 |
| 3,940,884 | 3/1976 | Mason | 47/32 |
| 4,268,992 | 5/1981 | Scharf | 47/23 |
| 4,648,203 | 3/1987 | Worzek | 47/32 |

FOREIGN PATENT DOCUMENTS 2168582  6/1986  United Kingdom ..................... 47/23

*Primary Examiner*—James R. Feyrer

[57] ABSTRACT

A shield made of high impact polyurethane plastic, molded in two half sections which can be fitted over the base portion of a tree trunk where it widens into the soil. The shield includes anchors for a bottom flange and provides for enlarging a top, flange defined hole. The facing edges of the half sections accommodate molded locking connectors in enlarged or swollen portions.

1 Claim, 5 Drawing Figures

TREE BARK PROTECTOR

BACKGROUND OF THE INVENTION

This invention is intended to be used to protect the trunks of young trees from the widespread use of nylon line trimmers and the damage created by lawnmowers.

Earlier devices were designed to protect young trees from rabbits and other vermin. Later devices have utilized metal or plastic cylinders. One such device utilized a watering system as disclosed in U.S. Pat. No. 4,268,992.

I am of the opinion that the watering system of this kind is not necessary for young trees, as a tree receives its water and nurishment further out from the base of the tree, through the feeder roots at the dripline. Also, the design of U.S. Pat. No. 4,268,992 is to large and complicated to be accepted into normal landscape design. It would require constant maintenance such as the cleaning of leaves, grass clippings, dirt, etc.

My invention overcomes the above disadvantages by its simple-and uncomplicated design, ease of installation, and requires little or no maintenance.

SUMMARY OF THE INVENTION

My tree bark protector is useful to protect the trunks of young trees from the damage done by the use of nylon line trimmers and the decks of lawnmowers.

My invention is a new idea in that it is simple and clean in design and will require little or no maintenance. My tree bark protector consists of two identical, connectable half sections held together by molded snaps.

One aspect of the invention is that it has a bell-shaped base to allow for the base of the tree or bud-union, not previously allowed for.

Another aspect of the invention is that it allows for two (or more) 6 inch galvanized steel spikes to hold device in place.

Yet another aspect of the invention is that the top allows for use on several sizes of trees by a cut-a-way design.

DESCRIPTION OF THE PREFERRED EMBODIMENT

Figure 1:
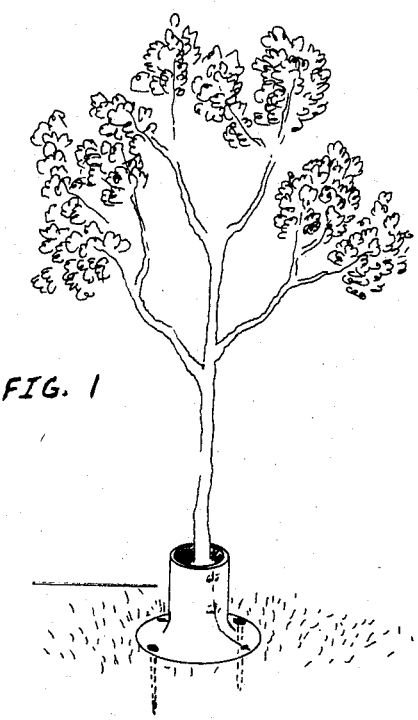
FIG. 1 is a perspective view of the tree bark protector in use.

Referring now by reference numerals to the drawing and first to FIG. 1, nuneral 1 shows the tree bark protector surrounding a small tree.

Figure 2:
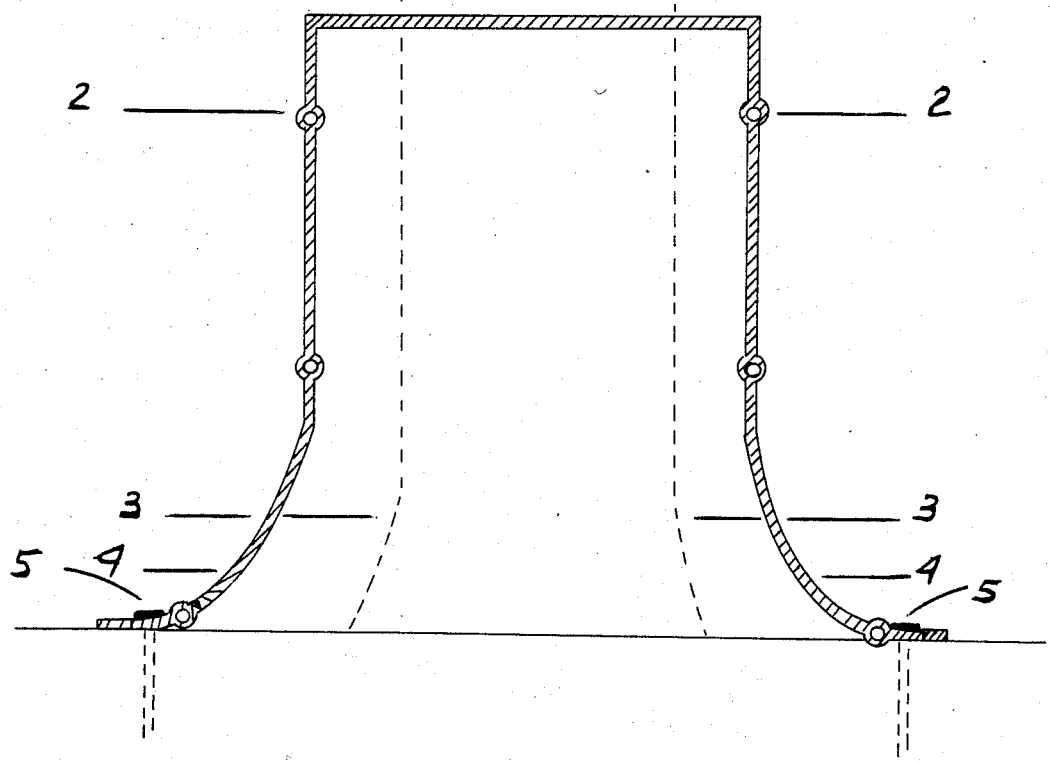
FIG. 2 is an enlarged longitudinal cross sectional view of the device.

Referring to FIG. 2, numeral 2 refers to the fasteners by which the two half sections are connected.

More particularly, and referring again to FIG. 2, numeral 3 relates to the base or bud-union of the tree. Note the curvature of the tree as it enters the ground. This has been allowed for in the design of the protector.

Referring again to FIG. 2, numeral 4 refers to the hub constructed in a manner to allow for this curvature at the base of the tree.

Referring again to FIG. 2, numeral 5 refers to the spikes to hold the device in place. The spikes are 6 inch galvanized steel.

Figure 3:
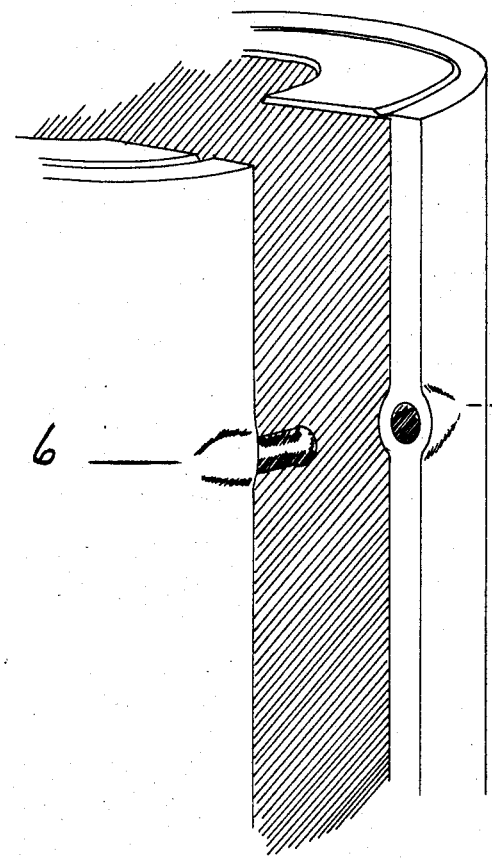
FIG. 3 is an exploded perspective view illustrating the fastening connectors.

FIG. 3, numeral 6 refers to the male portion of the fastener.

Again referring to FIG. 3, numeral 7 refers to the female portion of the fastener.

Figure 4:
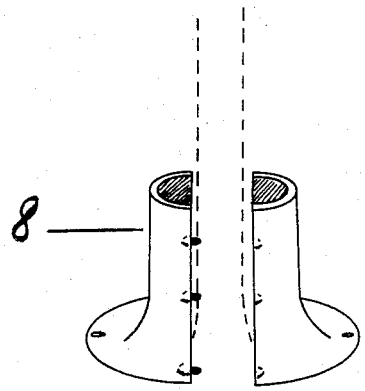
FIG. 4 is a view of the device as it is placed around the tree.

FIG. 4, numeral 8 refers to the device as it is placed around the tree.

Figure 5:
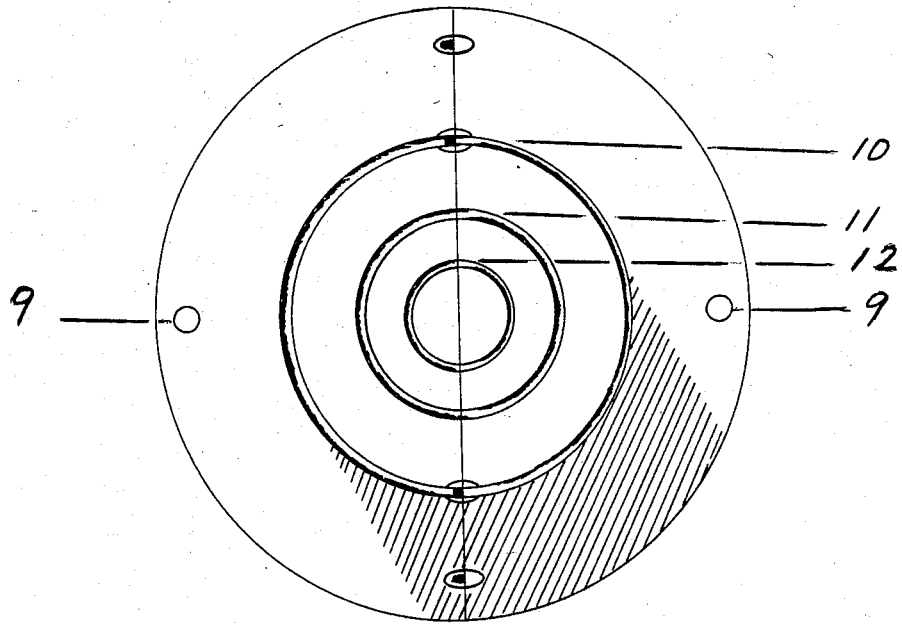
FIG. 5 is a plan view of the device illustrating the cut-a-way design.

FIG. 5, numeral 9 refers to the holes provided for the spikes.

Referring again to FIG. 5, numeral 10 refers to the top of the device showing the 6 inch opening.

Referring again to FIG. 5, numeral 11 refers to the top of the device showing the cut-away for a 4 inch opening.

Referring again to FIG. 5, numeral 12 refers to the top with a 2 inch opening.

More particularly, and referring to FIG. 5, numerals 10, 11, and 12 refer to the cut-away design of the device to allow one size protector to be used on several calipers of trees.

The tree bark protector by virtue of being formed by two identical half sections is easily connected around the base of the tree by the snap connectors and secured by driving the spikes into the ground.

I claim:

1. A shield assembly for protecting bark on the basal portion of a tree from the girdling action of lawn trimming equipment, comprising, in combination:

two identical half sections of molded high impact polyurethane plastic;

at least one aperture in a ground contacting portion of each half section;

a spike for inserting through each said aperture for anchoring the assembled shield in its protecting position, the improvement comprising:

the shield assembly having a cylindrical upper portion which gradually tapers downwardly and outwardly to an outwardly directed horizontal flange, said flange adapted to seat on the ground surface, said aperture located within the extent of said flange;

a horizontal, internally formed second flange extending inwardly from the top edge of the cylindrical upper portion and defining a central hole through which the trunk of a tree may extend, said second flange including at least one concentric V-shaped groove spaced between said top edge and said central hole to define at least one removable flange section, whereby the hole can be enlarged by removal of said removable flange section, to accommodate a larger tree trunk;

the facing edges of each half section including facing swollen wall portions, said swollen wall portions including apertures for receiving molded locking connector means; and, molded locking connector means for interconnecting said facing edges of each half section, whereby, the half sections may be connected over the enlarged basal portion of a tree to shield the bark against contact by lawn trimming equipment.

* * * * *